US012530766B2

(12) United States Patent
Heng et al.

(10) Patent No.: US 12,530,766 B2
(45) Date of Patent: Jan. 20, 2026

(54) CLINIC-DRIVEN MULTI-LABEL CLASSIFICATION FRAMEWORK FOR MEDICAL IMAGES

(71) Applicant: The Chinese University of Hong Kong, Hong Kong (CN)

(72) Inventors: Pheng Ann Heng, Hong Kong (CN); Yuhan Zhang, Hong Kong (CN)

(73) Assignee: The Chinese University of Hong Kong, Hong Kong (CN)

( * ) Notice: Subject to any disclaimer, the term of this patent is extended or adjusted under 35 U.S.C. 154(b) by 364 days.

(21) Appl. No.: 18/129,795

(22) Filed: Mar. 31, 2023

(65) Prior Publication Data

US 2024/0331137 A1 Oct. 3, 2024

(51) Int. Cl.
*G06V 10/764* (2022.01)
*G06T 7/00* (2017.01)
(Continued)

(52) U.S. Cl.
CPC .......... *G06T 7/0012* (2013.01); *G06V 10/764* (2022.01); *G06V 10/7715* (2022.01);
(Continued)

(58) Field of Classification Search
CPC .... G06V 10/764; G06V 10/82; G06V 10/774; G06V 10/776; G06V 2201/03; G06V 20/70; G06V 10/809; G06V 10/454; G06V 10/40; G06V 10/44; G06V 10/762; G06V 10/765; G06V 10/98; G06V 20/00; G06V 10/30; G06V 10/751; G06V 10/761; G06V 10/763; G06V 10/7715; G06V 10/772; G06V 10/778; G06V 10/84; G06V 20/41; G06N 3/045; G06N 3/08; G06N 20/00;
(Continued)

(56) References Cited

U.S. PATENT DOCUMENTS 10,679,046 B1 *  6/2020  Black .................. G06V 40/23
11,568,970 B2 *  1/2023  Lyman ................ G06F 3/0484
(Continued)

OTHER PUBLICATIONS

Chen, et al., "Label Co-occurrence Learning With Graph Convolutional Networks For Multi-label Chest X-ray Image Classification," IEEE J Biomed Health Inform, vol. 24(8), pp. 2292-2302 (Aug. 2020).

(Continued)

*Primary Examiner* — Tsung Yin Tsai
(74) *Attorney, Agent, or Firm* — Kilpatrick Townsend & Stockton LLP

(57) ABSTRACT

Machine-learning systems and methods can perform multi-label classification of medical images in a clinical context. A system can incorporate a triplet attention network that combines category-attention, self-attention, and cross-attention to learn high-quality label embeddings by mining effective information from medical images. The set of labels can include a single "hybrid" label assigned to multiple low-frequency diseases. The machine-learning system can be trained using a dual-pool contrastive learning technique. In the inference stage, the trained network can use a dual-pool contrastive inference technique to reduce the likelihood of false negatives and enhance the ability to detect diseases not seen in the training data.

20 Claims, 16 Drawing Sheets
(10 of 16 Drawing Sheet(s) Filed in Color)

(51) Int. Cl.

| | |
|---|---|
| *G06V 10/77* | (2022.01) |
| *G06V 10/774* | (2022.01) |
| *G06V 10/776* | (2022.01) |
| *G06V 10/82* | (2022.01) |
| *G06V 20/70* | (2022.01) |
| *G16H 30/40* | (2018.01) |
| *G16H 50/20* | (2018.01) |

(52) U.S. Cl.
CPC .......... *G06V 10/774* (2022.01); *G06V 10/776* (2022.01); *G06V 10/82* (2022.01); *G06V 20/70* (2022.01); *G16H 30/40* (2018.01); *G16H 50/20* (2018.01); *G06T 2207/20081* (2013.01); *G06T 2207/20084* (2013.01); *G06T 2207/30004* (2013.01); *G06V 2201/03* (2022.01)

(58) Field of Classification Search
CPC .......... G06N 3/084; G06N 3/04; G06N 3/088; G06N 3/008; G06N 3/0455; G06N 3/0464; G06N 3/047; G06N 3/00; G06N 3/0442; G06N 3/063; G06N 3/0895; G06N 3/09; G06F 18/214; G06F 18/241; G06F 18/2411; G06F 18/23213; G06F 18/254; G06F 18/211; G06F 18/22; G06F 18/24147; G06F 16/583; G06F 16/5838; G06F 16/5854; G06F 18/2413; G06F 40/30; G06F 1/022; G06F 16/245; G06F 17/11; G06F 18/10; G06F 18/213; G06F 18/2155; G06F 18/232; G06F 18/2431; G06F 21/55; G06F 21/552; G06F 21/56; G06F 21/566; G06F 2218/04; G06T 2207/20081; G06T 2207/20084; G06T 3/40; G06T 3/60; G06T 7/0012; G06T 2207/30061; G06T 2207/30141; G06T 7/0004; G06T 7/11; G06T 7/13; G06T 2207/30004; G06Q 20/4016; Y02T 10/40; G16H 30/40; G16H 50/20; H04L 63/1408; H04L 63/1416; H04L 63/1425; H04L 63/1441; H04L 63/145; H04L 63/20

See application file for complete search history.

(56) References Cited

U.S. PATENT DOCUMENTS

| | | | |
|---|---|---|---|
| 2015/0086091 A1* | 3/2015 | Rezaee | G06F 18/2323 |
| | | | 382/128 |
| 2019/0080450 A1* | 3/2019 | Arar | G06T 7/194 |
| 2021/0057067 A1* | 2/2021 | Lyman | G06N 20/00 |
| 2021/0089786 A1* | 3/2021 | Kon | G06T 7/0012 |
| 2022/0318995 A1* | 10/2022 | Chen | G16H 50/20 |
| 2022/0344033 A1* | 10/2022 | Wang | G06N 3/08 |
| 2023/0092027 A1* | 3/2023 | Bian | G16H 50/20 |
| | | | 382/128 |
| 2023/0290135 A1* | 9/2023 | Zhou | G06V 20/56 |
| 2024/0331137 A1* | 10/2024 | Heng | G06V 10/764 |
| 2025/0086785 A1* | 3/2025 | Sellergren | G06V 10/776 |

OTHER PUBLICATIONS

Luo, et al., "Deep Mining External Imperfect Data for Chest X-Ray Disease Screening," in IEEE Transactions on Medical Imaging, vol. 39, No. 11, pp. 3583-3594 (Nov. 2020).

Agu, et al., "Anaxnet: Anatomy Aware Multi-label Finding Classification in Chest X-ray," arXiv:2105.09937v1 [cs.CV], 11 pages (2021).

Wang, et al., "Multi-Label Classification of Fundus Images with EfficientNet," IEEE Accessm, vol. 8., pp. 212499-212508 (2020).

Lanchantin, et al., "General Multi-Label Image Classification With Transformers," IEEE/CVF Conference on Computer Vision and Pattern Recognition (CVPR), pp. 16478-16488 (2021).

Zhang, et al., "Lam Net: A Lesion Attention Maps-Guided Network for the Prediction of Choroidal Neovascularization Volume in SD-OCT Images," IEEE J Biomed Health Inform. vol. 26(4), pp. 1660-1671 (2022).

Zhang, et al., "An Integrated Time Adaptive Geographic Atrophy Prediction Model For SD-OCT Images," Med Image Analysis, vol. 68, pp. 1-16 (2021).

Zhang, et al., "Twin Self-supervision Based Semi-supervised Learning (TS-SSL): Retinal Anomaly Classification In SD-OCT Images," Neurocomputing, vol. 462, pp. 491-505 (2021).

Zhang, et al., "Robust Layer Segmentation Against Complex Retinal Abnormalities For en face OCTA Generation," MICCAI, 10 pages (2020).

Zhang, et al., "A Multi-scale Deep Convolutional Neural Network For Joint Segmentation And Prediction of Geographic Atrophy In SD-OCT Images," 2019 IEEE 16th International Symposium on Biomedical Imaging, pp. 565-568 (2019).

Zhang, et al., "Triplet attention and dual-pool contrastive learning for clinic-driven multi-label medical image classification," Medical Image Analysis, vol. 86, 11 pages (2023).

* cited by examiner

| Methods | ODIR | | | | | NIH-ChestXray14 | | | | |
|---|---|---|---|---|---|---|---|---|---|---|
| | AP | AR | AF1 | AK | ACC | AP | AR | AF1 | AK | ACC |
| DB-Focal (Wu et al. (2020)) | 60.34 | 53.87 | 56.92 | 50.62 | 52.56 | 77.62 | 72.78 | 75.12 | 70.59 | 60.43 |
| C-Tran (Lanchantin et al. (2021)) | 67.84 | 62.51 | 65.06 | 59.72 | 56.73 | 83.18 | 80.40 | 81.77 | 75.22 | 63.75 |
| Q2L (Liu et al. (2021)) | 65.80 | 61.46 | 63.56 | 57.73 | 55.56 | 82.95 | 80.21 | 81.56 | 74.83 | 63.12 |
| CheXGCN (Chen et al. (2020a)) | 64.56 | 58.47 | 61.36 | 56.91 | 53.12 | 80.05 | 76.47 | 78.22 | 72.28 | 61.78 |
| AnaXNet (Agu et al. (2021)) | 64.77 | 57.12 | 60.70 | 56.83 | 52.04 | 81.20 | 76.76 | 78.92 | 72.41 | 61.52 |
| MCG-Net (Lin et al. (2021)) | 63.39 | 58.86 | 61.04 | 53.52 | 53.18 | 82.04 | 78.95 | 80.47 | 74.41 | 62.03 |
| DRT (Song et al. (2021)) | 65.85 | 59.93 | 62.75 | 57.60 | 53.78 | 80.78 | 76.92 | 78.80 | 72.66 | 61.44 |
| TA-DCL (Ours) | 70.35 | 67.36 | 68.82 | 61.53 | 58.91 | 84.37 | 83.03 | 83.69 | 76.32 | 64.82 |

FIG. 11

| Methods | ODIR | | | | NIH-ChestXray14 | | | |
|---|---|---|---|---|---|---|---|---|
| | AP | AR | AF1 | AK | AP | AR | AF1 | AK |
| DB-Focal (Wu et al. (2020)) | 42.45 | 39.63 | 40.99 | 31.24 | 49.36 | 45.65 | 47.43 | 36.73 |
| C-Tran (Lanchantin et al. (2021)) | 44.27 | 42.13 | 43.17 | 33.72 | 52.53 | 48.02 | 50.17 | 39.19 |
| Q2L (Liu et al. (2021)) | 43.91 | 43.28 | 43.59 | 32.65 | 52.48 | 48.71 | 50.52 | 41.05 |
| CheXGCN (Chen et al. (2020a)) | 44.69 | 42.51 | 43.57 | 38.02 | 53.55 | 49.49 | 51.44 | 43.94 |
| AnaXNet (Agu et al. (2021)) | 42.98 | 40.22 | 41.55 | 35.71 | 51.06 | 47.33 | 49.12 | 38.69 |
| MCG-Net (Lin et al. (2021)) | 47.72 | 43.41 | 45.46 | 34.66 | 50.77 | 48.03 | 49.36 | 39.12 |
| DRT (Song et al. (2021)) | 43.45 | 40.38 | 41.86 | 37.87 | 51.54 | 47.48 | 49.43 | 38.96 |
| TA-DCL (Ours) | 62.53 | 60.42 | 61.46 | 53.94 | 68.76 | 65.53 | 67.11 | 59.65 |

| DCT | DCI | ODIR | | | NIH-ChestXray14 | | | |
|---|---|---|---|---|---|---|---|---|
| | | AP | AR | AFI | AK | AP | AR | AFI | AK |
| x | x | 68.84 | 63.79 | 66.22 | 60.41 | 83.69 | 81.43 | 82.54 | 75.84 |
| x | √ | 70.18 | 65.67 | 67.85 | 61.25 | 84.12 | 81.87 | 82.97 | 76.18 |
| √ | √ | 70.35 | 67.36 | 68.82 | 61.53 | 84.37 | 83.03 | 83.69 | 76.32 |

CLINIC-DRIVEN MULTI-LABEL CLASSIFICATION FRAMEWORK FOR MEDICAL IMAGES

BACKGROUND

This disclosure relates generally to the classification of medical images using machine learning and in particular to an automated multi-label classification network for medical images.

Medical image classification generally involves reviewing images to determine whether characteristics of various diseases are present or absent. Traditionally, such evaluations have been the exclusive province of trained clinicians. More recently, it has been demonstrated that computer-implemented systems using deep learning techniques can be trained to determine whether a medical image indicates health or disease, or whether characteristics of a specific disease appears in the medical image. Such systems can relieve repetitive workloads and improve diagnosis efficiency for clinicians.

The earliest deep-learning image classifiers implemented single-label classification (SLC) that could only deal with one disease. With the development of large-scale datasets, increased clinical demands, and advances in computer techniques, the limitations of SLC have become increasingly apparent. For example, medical images often contain characteristics of multiple diseases, and it is more clinically useful for a classification system to be able to associate a medical image with multiple disease labels. However, training an independent binary single-label classifier for each disease is expensive and difficult. Therefore, it is desirable to develop deep learning techniques that can perform multi-label classification (MLC) on medical images. In general, MLC involves learning which one or more labels from a predefined set of mutually non-exclusive labels applies to a particular input item such as a medical image. A simple implementation of MLC can involve training a one-vs-rest binary classifier for each label. More advanced techniques account for dependencies and correlations between different labels. For instance, static graphs have been used to reflect statistical co-occurrence among labels in the training data, and such graphs have been provided as inputs to MLC networks. However, static graphs require large data sets for accuracy, which are not always available, particularly for diseases seen with low frequency. Dynamic graphs have been implemented using attention mechanisms to enable the network to learn correlation patterns, with somewhat better results.

Training of an MLC network for clinical use in the detection of disease in medical images presents challenges. One of these challenges is training sample bias. Where diseases differ in frequency of occurrence, sample imbalance between different diseases can become a significant problem, which can be partially (but not fully) alleviated by using modified loss functions to correct for sampling bias. Another challenge for training MLC networks is that in clinical practice, it is difficult to predefine a complete label set for all diseases. In fact, it is almost inevitable that unseen diseases (i.e., diseases not included in the training set) may appear in a clinical setting. Without prior training, the automated classifier is likely to fail to assign any disease label to an image that includes an unseen disease. Such false negatives can lead to adverse consequences for patient care.

Accordingly, improved techniques for automated multi-label classification of medical images would be desirable.

SUMMARY

Certain embodiments of the present invention relate to machine-learning systems and methods that can perform multi-label classification of medical images in a clinical context. In some embodiments, the machine-learning system incorporates a triplet attention network that combines category-attention, self-attention, and cross-attention to learn high-quality label embeddings by mining effective information from medical images. For enhanced flexibility, the set of labels can include a single "hybrid" label assigned to multiple low-frequency diseases. As described below, the hybrid label can reduce sampling bias during training and can also improve the flexibility by facilitating the detection of unseen diseases in the inference stage. The machine-learning system can be trained using a dual-pool contrastive learning technique that combines "inter-pool" contrastive learning based on the similarity of label embeddings from the same disease label between a "negative" sample pool (where no diseases are present) and a "positive" sample pool (where at least one disease is present), and "intra-pool" contrastive learning based on similarity of label embeddings of different disease labels in the same pool. In the inference stage, the trained network can use a dual-pool contrastive inference technique that compares label embeddings generated by the trained network for a test sample with label embeddings generated by the trained network for negative samples. As described below, such dual-pool contrastive inference techniques can reduce the likelihood of false negatives, thereby reducing clinical risk associated with classification errors, and can also improve the ability of the system to detect unseen diseases.

The following detailed description, together with the accompanying drawings, will provide a better understanding of the nature and advantages of the claimed invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 11 shows a table summarizing overall performance of an implementation of a multi-label classifier according to some embodiments and seven existing methods.

FIG. 12 shows a table showing the average evaluation results of unseen diseases from an implementation of a multi-label classifier according to some embodiments and seven existing methods.

FIGS. 14A and 14B show example test images and classification outputs illustrating an effect of dual-pool contrastive training according to some embodiments.

FIG. 15 shows a table presenting results of a quantitative analysis comparing metrics for implementations of a multi-label classifier according to some embodiments, with and without dual-pool contrastive training and dual-pool contrastive inference.

DETAILED DESCRIPTION

Figure 1:
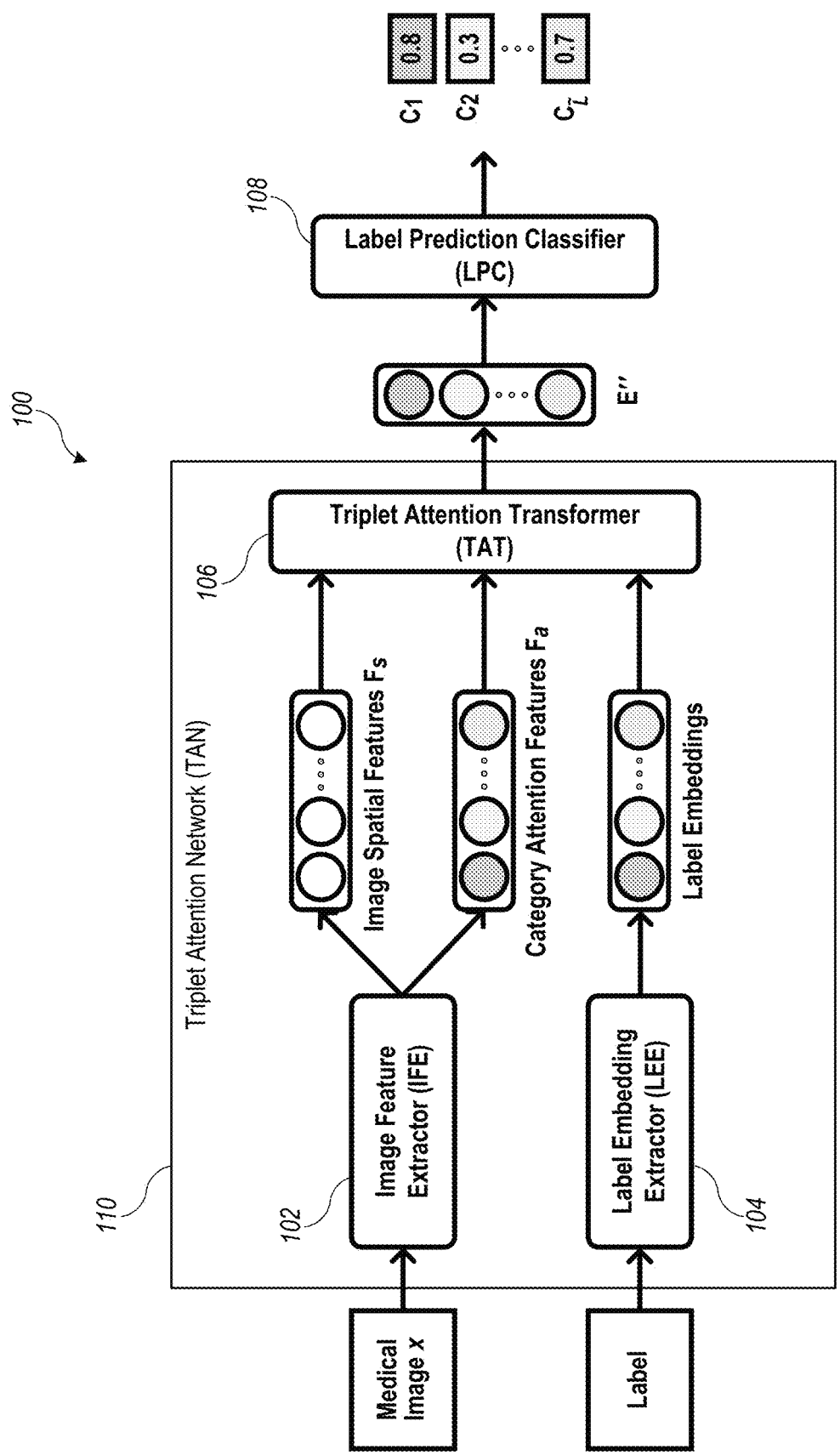
FIG. 1 shows a high-level workflow diagram for a multi-label classifier system using a triplet attention network according to some embodiments.

The following description of exemplary embodiments of the invention is presented for the purpose of illustration and description. It is not intended to be exhaustive or to limit the invention to the precise form described, and persons skilled in the art will appreciate that many modifications and variations are possible. The embodiments have been chosen and described in order to best explain the principles of the invention and its practical applications to thereby enable others skilled in the art to best utilize the invention in various embodiments and with various modifications as are suited to the particular use contemplated.

According to some embodiments, a multi-label classifier (MLC) system can be trained to determine (or predict) whether a medical image of a target organ shows evidence of any one or more of several diseases. In implementations of an MLC system described herein, the input item is a medical image of a target organ (or other anatomical structure or region), and the labels correspond to different diseases affecting the target organ. (The term "disease" is used herein to refer generally to an abnormal condition that is observable in a medical image and can but need not distinguish among specific causes of a given abnormality.) For example, an MLC system can be implemented where the input image is a color fundus image of a patient's eye and the labels correspond to different diseases affecting the eye, such as diabetic retinopathy, glaucoma, cataract, age-related macular degeneration, hypertensive retinopathy, myopia, and other diseases. As another example, an MLC system can be implemented where the input image is a chest X-ray and the labels correspond to different diseases affecting the chest, such as atelectasis, effusion, infiltration, mass, nodule, pneumothorax, consolidation, and other diseases. MLC systems of the kind described herein provide an adaptable machine-learning model that can be used with a variety of imaging modalities, target organs, and sets of diseases to be identified.

In embodiments described herein, an MLC system incorporates a "triplet attention network," or TAN, that can produce output label embeddings for a medical image. An "embedding" refers generally to a mapping that projects data into a high-dimensional feature space and retains task-relevant structure of the data. In the present context, the label embeddings can include an embedding of image features relevant to each disease (or label). These output label embeddings can be input to another classifier network that predicts a probability that the image is positive or negative with respect to each label. The predicted probability can be converted to a binary (positive or negative) label, e.g., by applying a preset threshold criterion.

Various networks and machine-learning systems described herein can incorporate deep neural networks. "Deep" neural networks include multiple layers of nodes, with the first layer operating on an input data sample and subsequent layers operating on outputs of one or more previous layers. The output of the network is the output of the last layer. Each node computes an output that is a weighted combination of its inputs, and each layer can include any number of nodes. (Nodes in the same layer operate independently of each other.) The network structure—including the number of layers, number of nodes in each layer, and the combination operation performed by each node—is generally fixed in advance.

Training of a deep neural network involves optimizing the weights for each node. A standard approach is to iteratively adjust the weights with the goal of minimizing a loss function that characterizes a difference between the output of the network for a given input and an expected result determined from a source other than the network. In "supervised" learning, the expected result is a ground truth result established by human annotation. For example, for an image classification task, human reviewers can annotate an image by generating labels for the image, where the labels indicate whether a particular disease is or is not present in the image. In "unsupervised" learning, the expected result is established using the output of another network rather than ground truth established by human annotation. Training generally occurs across multiple "epochs", where each epoch consists of one pass through the training data set. Adjustment to weights can occur multiple times during an epoch; for instance, the training data can be divided into "batches" or "mini-batches" and weight adjustment can occur after each batch or mini-batch. Aspects of neural networks and training that are relevant to understanding the present disclosure are described below; any other aspects can be modified as desired.

Multi-Label Classifier Using Triplet Attention Network

FIG. 1 shows a high-level workflow diagram for a multi-label classifier (MLC) system 100 according to some embodiments. Given a medical image x and a set of L pre-defined disease labels l (where L>1), MLC system 100 can be trained to predict whether each disease appears in x. The multi-label ground truth of x can be expressed as Y=[$y_1$, $y_2$, ..., $y_L$], where $y_l \in \{0,1\}$ is a discrete binary indicator; in the convention used herein, $y_l=1$ (a "positive" label) if disease l appears in x, otherwise $y_l=0$ (a "negative" label). (For a disease-free image x, $y_l=0$ for all values of l.) MLC system 100 can learn a classifier $\mathcal{F}(\bullet)$ to predict the probabilities $\hat{Y}$ of each disease appearing in x. The goal of training is that $\hat{Y}$ should be close to the ground truth Y, that is:

$$Y \sim \hat{Y} = \mathcal{F}(x). \tag{1}$$

In some embodiments, the set of diseases present in the training images can be divided into high-frequency diseases and low-frequency diseases based on the number of samples available (e.g., the number of images in the training set which are identified as positive for the disease). Each high-frequency disease can be assigned a different label, and all low-frequency diseases can be merged under a single "hybrid" label. Thus, if $L_{lf}$ is the number of low-frequency diseases, the ground truth of x can be expressed as $Y=[y_1, y_2, \ldots, y_{\tilde{L}}]$, where $\tilde{L}=L-L_{lf}+1$ and label $y_{\tilde{L}}$ is the hybrid label that represents all low-frequency diseases. Introduction of a hybrid label for low-frequency diseases can alleviate biases in training due to sample imbalance. In the inference stage, the hybrid label can improve detection of "unseen" diseases (i.e., diseases that were not present in the training data set).

MLC system 100 includes four learnable components: an image feature extractor (IFE) 102, a label embedding extractor (LEE) 104, a triplet attention transformer (TAT) 106, and a label prediction classifier (LPC) 108. IFE 102, LEE 104, and TAT 106 together provide a "triplet attention network," or "TAN," 110 that learns optimized label embeddings for the image features. Within TAN 110, IFE 102 converts medical images to image spatial features ($F_s$) and category attention features ($F_a$). LEE 104 produces initial label embeddings (E) with the same dimension as the image features for all disease labels. Image spatial features, category attention features, and initial label embeddings are provided as inputs to TAT 106. In TAT 106, label embeddings are reinforced by category attention features, and global dependencies and interactions with image spatial features are modeled via self-attention and cross-attention. The output of TAN 110 includes updated label embeddings, denoted E". LPC 108 receives the updated label embeddings and predicts the probability that the image is positive for each disease (or label). In some embodiments, a binary (positive or negative) decision as to each label can be made, e.g., by applying a preselected threshold to the probability output from LPC 108.

Figure 2:
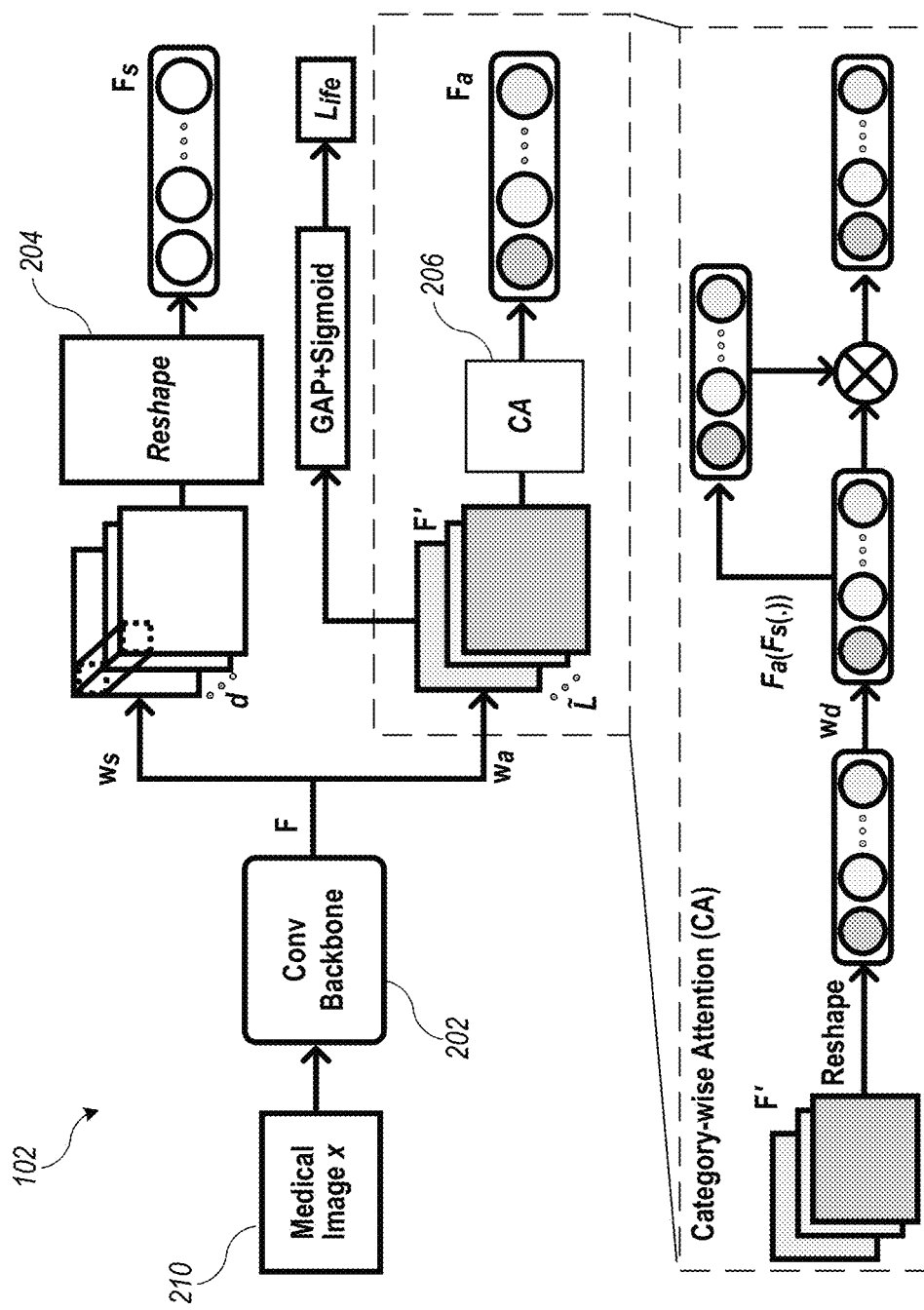
FIG. 2 shows a workflow diagram for an image feature extractor according to some embodiments.

FIG. 2 shows a workflow diagram for IFE 102 according to some embodiments. IFE 102 can include a convolutional backbone 202, a reshaper 204, and a category-wise attention module 206. Convolutional backbone 202 can be implemented using a variety of neural networks (in particular convolutional neural networks) capable of performing feature extraction on images; examples include Vgg, Xception, ResNet, and so on. Given a medical image x (shown at 210), convolutional backbone 202 outputs a corresponding matrix of deep features $F \in \mathbb{R}^{h \times w \times d}$, where h, w, d are the height, width, and channel of deep features. Reshaper 204 produces image spatial features matrix $F_s$ based on F, and category-wise attention feature extractor 206 separately produces category attention features matrix $F_a$ based on F.

Image spatial features matrix $F_s$ retains the image information of interest while omitting less relevant information. In some embodiments, image spatial features matrix $F_s$ can be obtained from features F according to:

$$F_s \in \mathbb{R}^{hw \times d} = \text{Reshape}(w_s F), \quad (2)$$

where $w_s \in \mathbb{R}^{d \times d}$ is a point-to-point projection matrix, and Reshape(•) is an operation that changes the feature dimensions from h×w×d to hw×d. In $F_s$, each sub-feature $f_s^p \in \mathbb{R}^d$ where p∈[1, hw], can be regarded as a concentration of a spatial local region in the original image space.

Category attention features $F_a$ can represent the significance of deep features F to different categories. In the workflow of FIG. 2, a point-to-point projection matrix $w_a \in \mathbb{R}^{d \times L}$ is applied to generate $F' \in \mathbb{R}^{h \times w \times L}$, after which category-wise attention (CA) module 206 is applied to produce $F_a$ according to:

$$F_a \in \mathbb{R}^{L \times d} = CA(F') = CA(w_a F). \quad (3)$$

Figure 3:
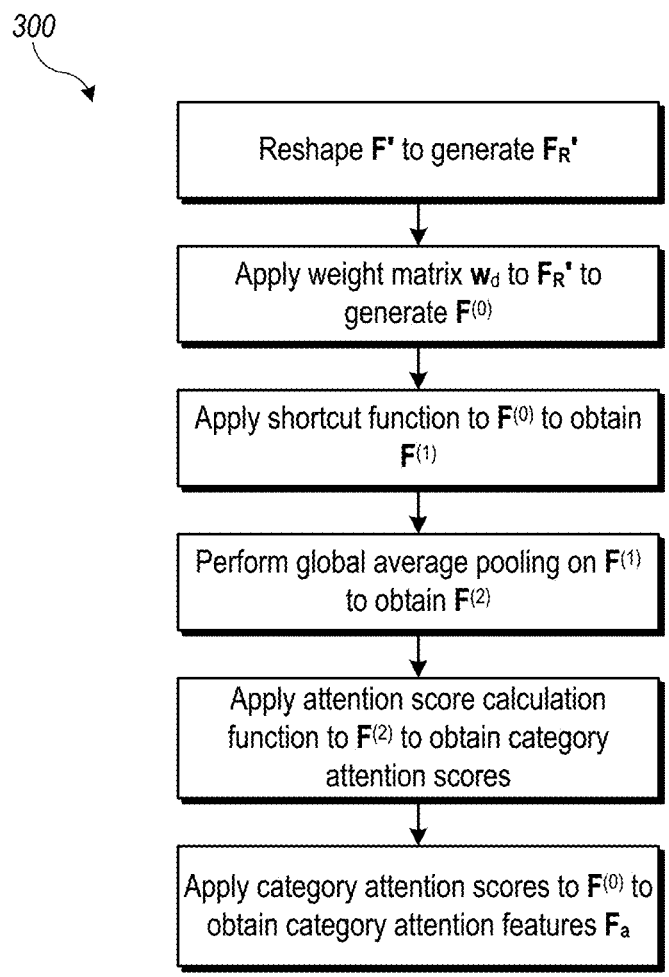
FIG. 3 shows a flow diagram of a process implementing a category-wise attention function according to some embodiments.

FIG. 3 shows a flow diagram of a process 300 implementing the function CA(•) according to some embodiments. The function CA(•) is also illustrated in inset 220 in FIG. 2. At block 302, a reshape operation is applied to feature matrix F' to change the feature dimensions from h×w×$\tilde{L}$ to $\tilde{L}$×hw, producing a reshaped feature matrix $F_R'$. At block 304, a learnable weight matrix $w_d \in \mathbb{R}^{hw \times L}$ is multiplied by $F_R'$ to generate matrix $F^{(0)}$. At block 306, a shortcut function is applied to matrix $F^{(0)}$ to obtain matrix $F^{(1)}$. At block 308, global average pooling is performed on matrix $F^{(1)}$ to obtain matrix $F^{(2)}$. At block 310, an attention score calculation function is applied to matrix $F^{(2)}$ to obtain category attention scores. At block 312, the category attention scores are applied to matrix $F^{(0)}$ to obtain category attention features $F_a$.

During training, effectiveness of image attention features can be assessed by directly applying global average pooling (GAP) and sigmoid activation to feature matrix F' to make intermediate label predictions. These predictions can be measured against ground truth using cross-entropy (CE) loss to provide a loss term:

$$\mathcal{L}_{ife} = CE(\sigma(GAP(F')), Y), \quad (4)$$

where σ(•) denotes the sigmoid activation. The loss term of Eq. (4) participates in model optimization as part of the overall loss as described below.

Referring again to FIG. 1, for each image, label embedding extractor 104 generates initial label embeddings $E \in \mathbb{R}^{\tilde{L} \times d} = [e_1, e_2, \ldots, e_{\tilde{L}}]$ for $\tilde{L}$ disease labels, where $e_l \in \mathbb{R}^d$ is the label embedding of disease-l. Label embedding extractor 104 can be implemented using an automated label embedding layer, which can be of conventional or other design. The initial label embeddings are provided to triplet attention transformer 106, together with the image spatial features and category attention features determined using image feature extractor 102. For purposes of description, label embedding $e_l$ is referred to as a "negative" label embedding if its ground truth $y_l$=0 and as a "positive" label embedding otherwise. The aim of triplet attention transformer 106 is to make the correct binary prediction for each negative/positive label embedding.

According to some embodiments, triplet attention transformer 106 is implemented using a "transformer" network architecture. Originally developed for language modeling, transformer network architectures have more recently found application in image processing. As used herein, a transformer network architecture contains an encoder module and a decoder module. The encoder module and the decoder module are each composed of several encoder and decoder layers with the same architecture. In particular, each encoder layer contains a self-attention layer and a feed-forward network (FFN), and each decoder layer contains a self-attention layer, a cross-attention layer and a FFN. In a self-attention layer, the input features Z are transformed into query features Q, key features K and value features V by three different (learnable) weight matrices $w_q$, $w_k$ and $w_v$:

$$Q = w_q Z, K = w_k Z, V = w_v Z. \qquad (5)$$

Then each sub-feature $q^p \in Q$ queries all sub-features in K to calculate the attention scores. Lastly, the attention scores are normalized and multiplied with corresponding sub-features in V. The process can be expressed in a single function:

$$Z' = \text{softmax}\left(\frac{QK^T}{\sqrt{d}}\right)V, \qquad (6)$$

where d is the feature dimension. In a cross-attention layer, the triplet (Q, K, V) is calculated from two different input features $Z^{(1)}$ and $Z^{(2)}$.

$$Q = w_q Z^{(1)}, K = w_k Z^{(2)}, V = w_v Z^{(2)}, \qquad (7)$$

and the attention calculation follows Eq. (6). Unlike the self-attention layers, which use query features to retrieve their own key features, the cross-attention layers use query features to retrieve key features from other input features.

Figure 4:
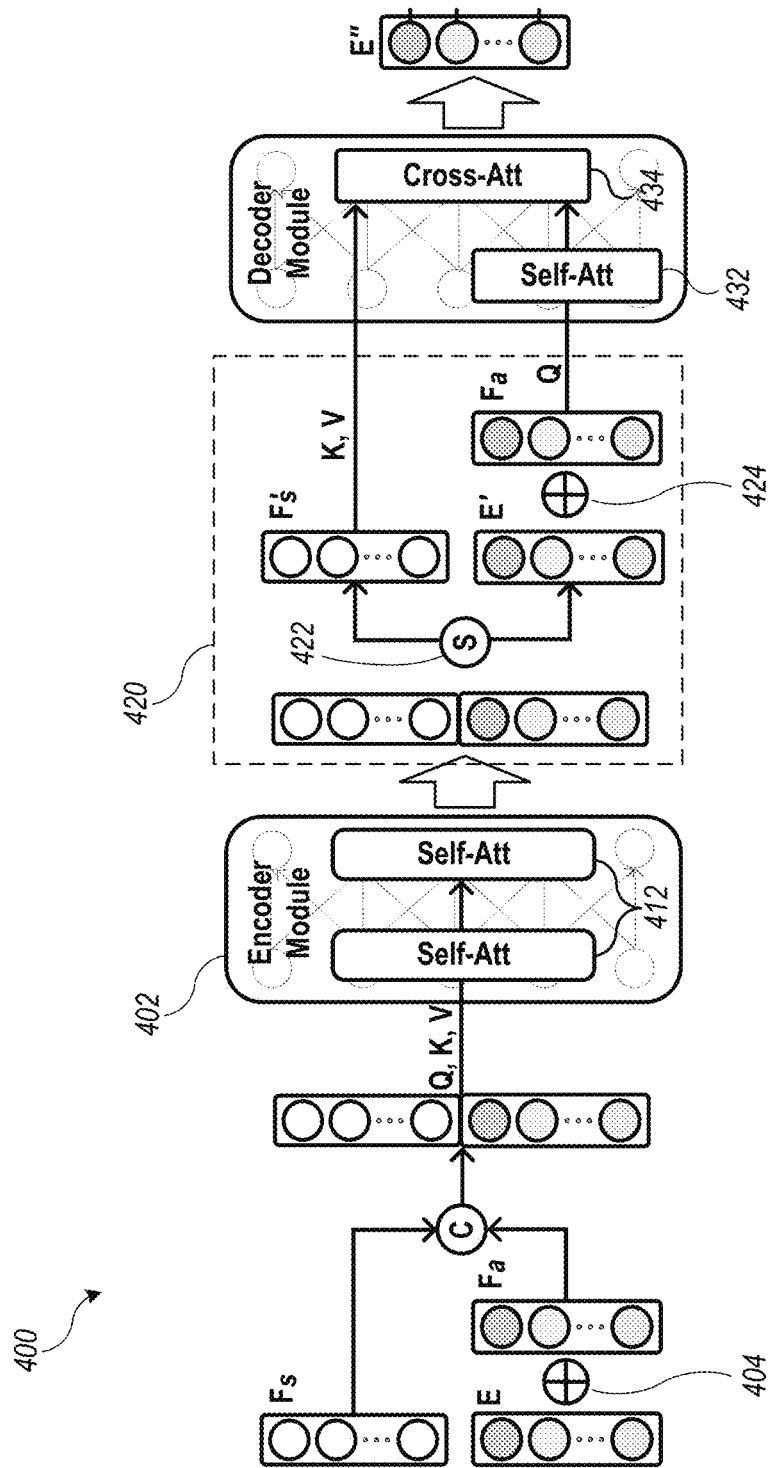
FIG. 4 shows a workflow diagram for a triplet attention transformer according to some embodiments.

FIG. 4 shows a workflow diagram for a triplet attention transformer 400 according to some embodiments. Triplet attention transformer 400 can be used to implement triplet attention transformer 106 of FIG. 1. Triplet attention transformer 400 includes three types of attention, namely category-attention, self-attention and cross-attention. Inputs to triplet attention transformer 400 include image spatial features $F_s$, category attention features $F_a$, and initial label embeddings E. In some embodiments, these inputs are generated using image feature extractor 102 and label embedding extractor 104, as described above.

Encoder module 402 receives the inputs and applies self-attention layers 412. While two self-attention layers 412 are shown, any number can be used. In some embodiments, the initial label embeddings E are first reinforced by category attention features $F_a$, as shown by combiner 404 after which the reinforced label embeddings are concatenated with image spatial features $F_s$. This allows self-attention layers 412 in encoder module 402 to model global dependencies. In other words, encoder module 402 can implement the following transformation:

$$[F'_s \in \mathbb{R}^{hw \times d}, E' \in \mathbb{R}^{L \times d}] = EM([F_s, E + F_a]), \qquad (8)$$

where EM(•) is the encoder module (implemented in accordance with Eqs. (5) and (6)), [•] is the concatenation operation, and $F'_s$ and E' are updated image spatial features and intermediate label embeddings, respectively.

After encoder module 402, the output can be modified to reinforce the category significance of label embeddings, as shown at block 420. The output of encoder module 402 is split by a splitter module 422 into updated image spatial features $F'_s$ and intermediate label embeddings E'. Category attention features $F_a$ are reintroduced using combiner module 424 to reinforce the category significance of the label embeddings.

Decoder module 430 includes one or more self-attention layers 432 and one or more cross-attention layers 434. While one layer of each type is shown, any number can be used. Self-attention layers 432 operate on the category-reinforced label embeddings. In cross-attention layers 434, label embeddings are used to calculate the query features Q, and updated image spatial features $F'_s$ are used to calculate the key features K and value features V. Accordingly, interactions between image spatial features and label embeddings are modeled via cross-attention layers 434 in decoder module 430. In other words, decoder module 430 can implement the following transformation:

$$E'' \in \mathbb{R}^{L \times d} = DM(F'_s, E' + F_a), \qquad (9)$$

where DM(•) denotes the decoder module and $E''=[e''_1, e''_2, \ldots, e''_L]$ are the updated (or output) label embeddings.

Figure 5:
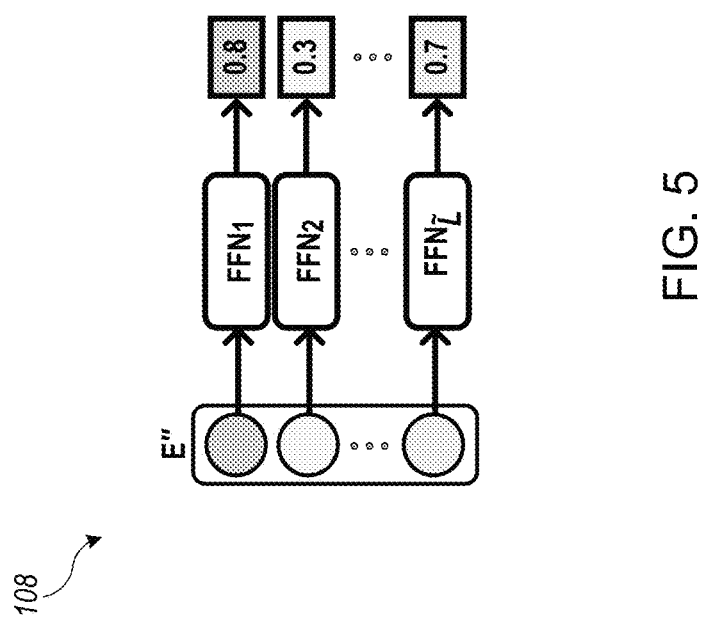
FIG. 5 shows an implementation of a label prediction classifier for a multi-label classifier according to some embodiments.

Referring again to FIG. 1, the updated label embeddings E" generated by triplet attention transformer 106 are provided to a label prediction classifier 108 that determines, based on the updated label embeddings, a probability that each disease is present in the input image. Label prediction classifier 108 can be implemented using one or more neural networks trained to perform multi-label classification. FIG. 5 shows an implementation of label prediction classifier 108 according to some embodiments. In this example, label prediction classifier 108 includes a set of $\tilde{L}$ feed-forward neural networks (FFN) 502-1 though 502-$\tilde{L}$. Each FFN 502-$l$ implements the transformation:

$$\hat{y}_l = FFN_l(e''_l) = \sigma(w_l e''_l + b_l), \qquad (10)$$

where $\hat{y}_l$ represents a probability that the image is positive for disease l, $w_l \in \mathbb{R}^{d \times 1}$ is the weight matrix, $b_l \in \mathbb{R}^1$ is the bias, and σ(•) is the sigmoid activation. Subsequently, a preselected threshold can be applied to $\hat{y}_l$ to make a binary (positive or negative) decision as to each label (or disease) l.

During training, cross-entropy loss can be used for model optimization with a loss term of the form:

$$\mathcal{L}_{tat} = CE(\hat{Y}, Y), \qquad (11)$$

where $\hat{Y}$ is the binary decision based on the outputs of the FFNs 502-1 though 502-$\tilde{L}$ and Y represents ground truth.

Dual-Pool Contrastive Training

In some embodiments, MLC system 100 can be trained using a technique referred to herein as "dual-pool contrastive training," or DCT. In general terms, DCT is a technique that enables MLC system 100 (or other machine-learning systems) to learn the differences between negative label embeddings and positive label embeddings for the hybrid label. DCT addresses certain challenges in training a multilabel classifier in conditions where diseases occur in the training set with different frequency, low-frequency diseases are merged under a single hybrid label (as described above), and/or it is desirable to detect diseases that are not included in the training set.

For purposes of description, a sample (or image) x is referred to as a "negative" sample if all disease labels are 0 in its multi-label ground truth $Y=[y_1, y_2, \ldots, y_L]$ and as a "positive" sample in any other case In other words, negative samples denote healthy samples and positive samples denote samples where at least one disease is present. A label embedding is referred to as "positive" or "negative" depending on whether the corresponding ground-truth label is positive or negative. It is noted that all label embeddings from negative samples, as well as most label embeddings from positive samples, are negative label embeddings.

In an implementation of DCT in MLC system 100, the training set can be split into a "negative sample pool" (which contains only negative samples) and a "positive sample pool" (which only contains positive samples). In the training stage, two independent mini-batches are randomly sampled from the two pools respectively and provided to MLC system 100 to obtain their updated label embeddings $E''_{negative} = [\ddot{e}''_1, \ddot{e}''_2, \ldots, \ddot{e}''_L]$ and $E''_{positive} = [\ddot{e}''_1, \ddot{e}''_2, \ldots, \ddot{e}''_L]$. In high-dimensional feature space, all negative label embeddings should be closer together and farther away from positive label embeddings, and there should also be differences among positive label embeddings from different high-frequency diseases. DCT can optimize the clustering centers of negative label embeddings and positive label embeddings from different disease labels, thereby better distinguishing whether a given label embedding is negative or positive, by learning about differences between the positive and negative sample pools as well as differences between samples in the positive sample pool.

Figure 6:
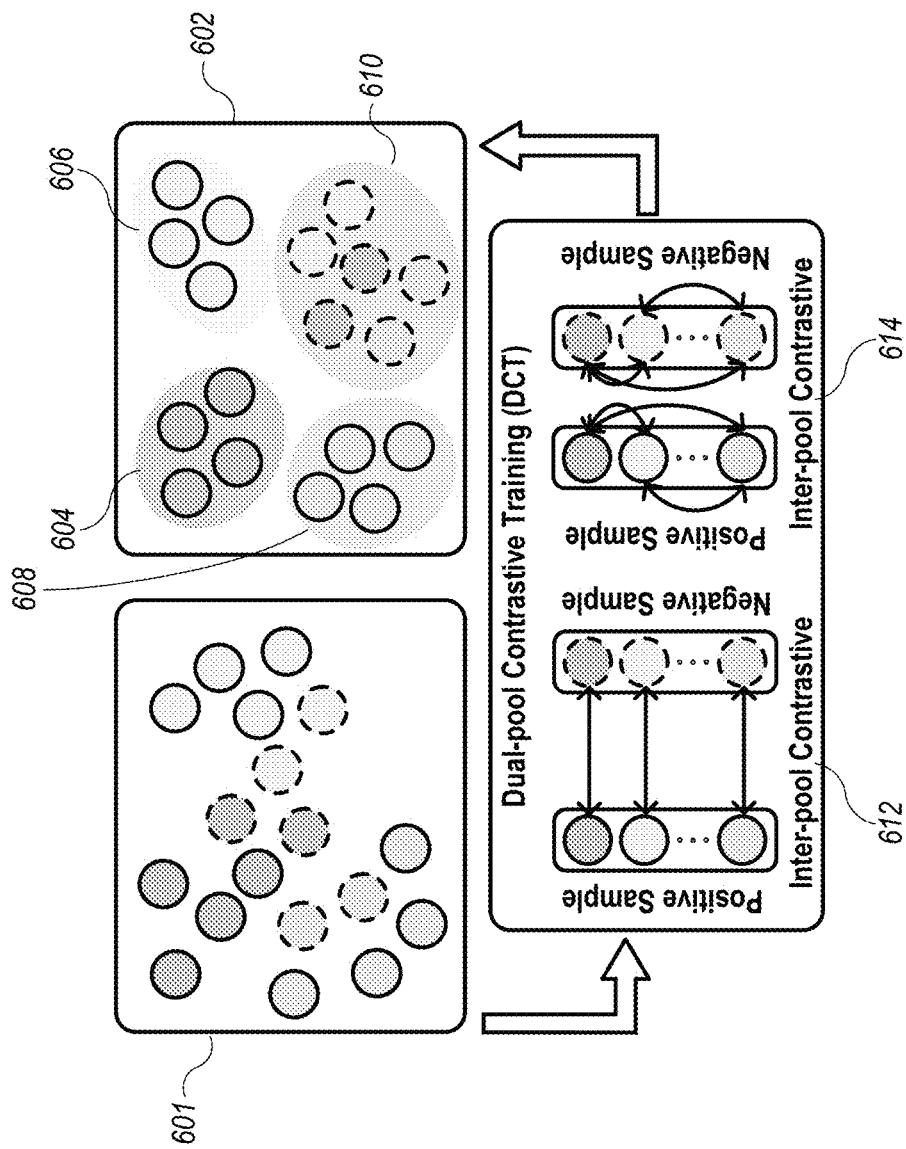
FIG. 6 is a conceptual diagram illustrating dual-pool contrastive training according to some embodiments.

FIG. 6 is a conceptual diagram illustrating an operating principle of DCT according to some embodiments. Each circle represents a label embedding. The fill color indicates the disease label. Dashed edges indicate a negative label embedding, and solid edges indicate positive label embeddings. Diagram 601 shows a state in which clustering is present as to embeddings for different labels but positive and negative embeddings are not clearly distinguished. Diagram 602 shows a desired state in which positive label embeddings for each disease are clustered (clusters 604, 606, 608) and negative label embeddings for all diseases are clustered in a separate cluster (cluster 610). To obtain the desired state, DCT incorporates inter-pool contrastive loss (depicted at 612) and intra-pool contrastive loss (depicted at 614).

"Inter-pool contrastive loss" measures the similarity of label embeddings from the same disease label between the positive and negative sample pools. For a positive sample, if $\ddot{e}''_l$ is a negative label embedding, it should be similar (shorter metric distance) to the label embedding $\ddot{e}''_l$ of a negative sample. The inter-pool contrastive loss can be written as:

$$\mathcal{L}_{irc} = -\log \frac{\sum_{l=1}^{L} \mathbb{1}_{[\hat{y}_l = y_l]} \exp\left(\frac{\ddot{e}''_l \cdot \ddot{e}''_l}{\tau}\right)}{\sum_{l=1}^{L} \exp\left(\frac{\ddot{e}''_l \cdot \ddot{e}''_l}{\tau}\right)}, \quad (12)$$

where $\mathbb{1}_{[\cdot]} = 1$ if the condition [·] is true and $\mathbb{1}_{[\cdot]} = 0$ otherwise, and t is a temperature hyperparameter.

"Intra-pool contrastive loss" measures differences between the positive label embeddings from different disease labels in the positive sample pool to ensure that the differences are distinguishing. For any two label embeddings $\ddot{e}''_i, \ddot{e}''_j \in E''_{positive}$, if both of them are negative label embeddings, the metric distance is reduced, otherwise it is kept large. The intra-pool contrastive loss can be written as:

$$\mathcal{L}_{iac} = -\log\left[1 - \frac{\sum_{i=1}^{L} \sum_{j=1}^{L} \mathbb{1}_{[\hat{y}_i \vee \hat{y}_j = 1]} \exp\left(\frac{\ddot{e}''_i \cdot \ddot{e}''_j}{\tau}\right)}{\sum_{i=1}^{L} \sum_{j=1}^{L} \left(\exp\left(\frac{\ddot{e}''_i \cdot \ddot{e}''_j}{\tau}\right) + \exp\left(\frac{\ddot{e}''_i \cdot \ddot{e}''_j}{\tau}\right)\right)}\right]. \quad (13)$$

Label supervision loss for positive samples and negative samples, respectively, can be calculated based on the combination of Eqs. (4) and (11):

$$\mathcal{L}_{negative}, \mathcal{L}_{positive} = \mathcal{L}_{ife} + \mathcal{L}_{tat}. \quad (14)$$

Overall model optimization can use a loss function that integrates label supervision loss and dual-pool contrastive loss. For instance, the loss function can be defined as:

$$\mathcal{L}_{total} = \frac{1}{N} \sum_{n=1}^{N} [\mathcal{L}_{negative} + \mathcal{L}_{positive} + \lambda(\mathcal{L}_{irc} + \mathcal{L}_{iac})], \quad (15)$$

where N is the number of samples in a mini-batch and A is a weight hyperparameter to balance label supervision and dual-pool contrastive loss.

Dual-Pool Contrastive Inference

Figure 7:
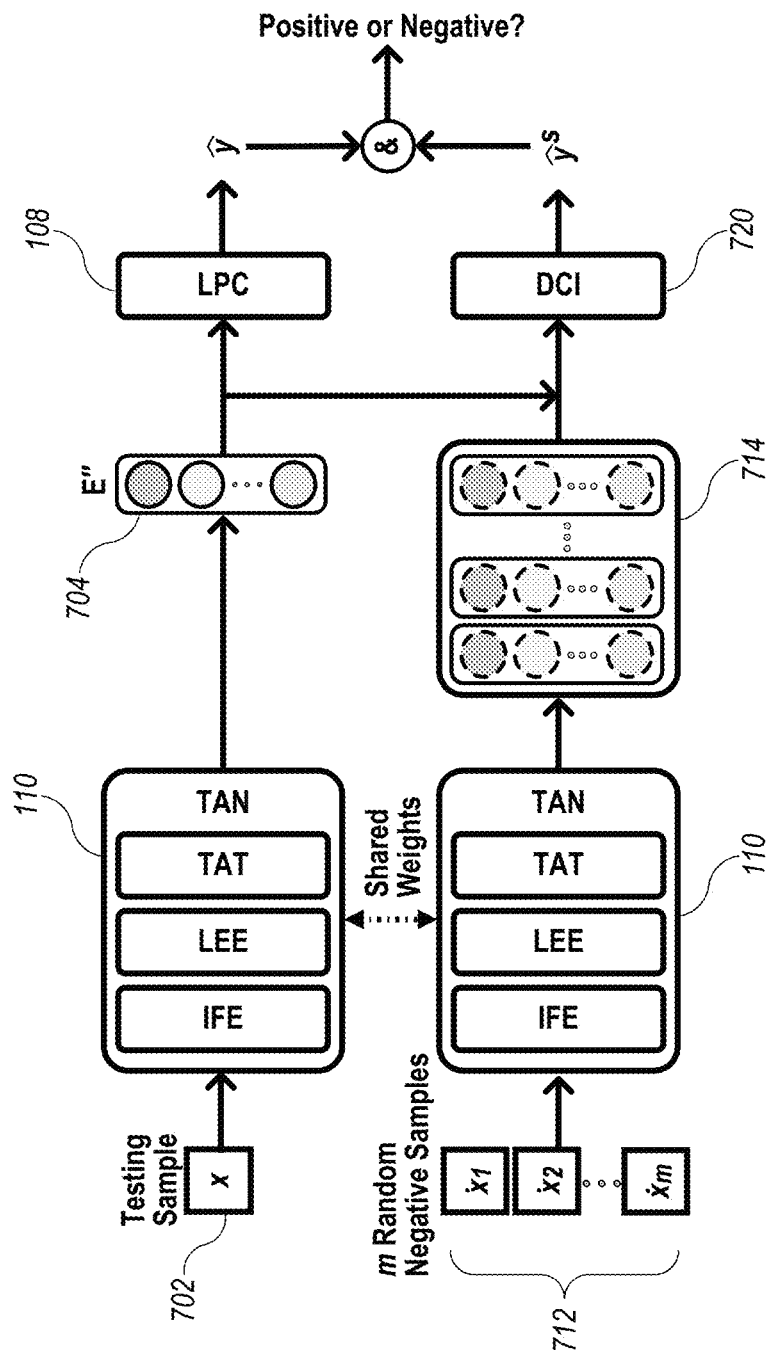
FIG. 7 shows an overview of a dual-pool contrastive inference process according to some embodiments.

According to some embodiments, a technique referred to herein as "dual-pool contrastive inference," or "DCI," can be used during the inference stage (i.e., after training) to further reduce the classification error of positive label embeddings and improve the ability to detect unseen diseases. FIG. 7 shows a workflow diagram of a DCI process using MLC system 100 according to some embodiments. It is assumed that MLC system 100 has already been trained and is now operating in the inference stage using learned weights.

As described above, when provided a testing sample 702 (i.e., a medical image x) during the inference stage, TAN 110 outputs label embeddings 704 (which includes a label embedding $e''_l$ for each disease l), and LPC 108 uses updated label embeddings 704 to generate a label prediction $\hat{y}_l$ for each disease l. To implement DCI, a number (m) of samples 712 from the negative sample pool are randomly selected and input to TAN 110 (using the same weights) to obtain their output label embeddings 714 (which includes label embeddings $\{\ddot{e}''_{l1}, \ldots, \ddot{e}''_{lm}\}$ for each disease l). A DCI module 720 receives the output label embeddings 704 for the test sample and the output label embeddings 714 for the random negative samples and performs a contrastive analysis for each disease l. The contrastive analysis can include a quantitative assessment of similarity between the output label embedding $e''_l$ for the testing sample and the output label embeddings $\{\ddot{e}''_{l1}, \ldots, \ddot{e}''_{lm}\}$ for the randomly selected negative samples.

Figure 8:
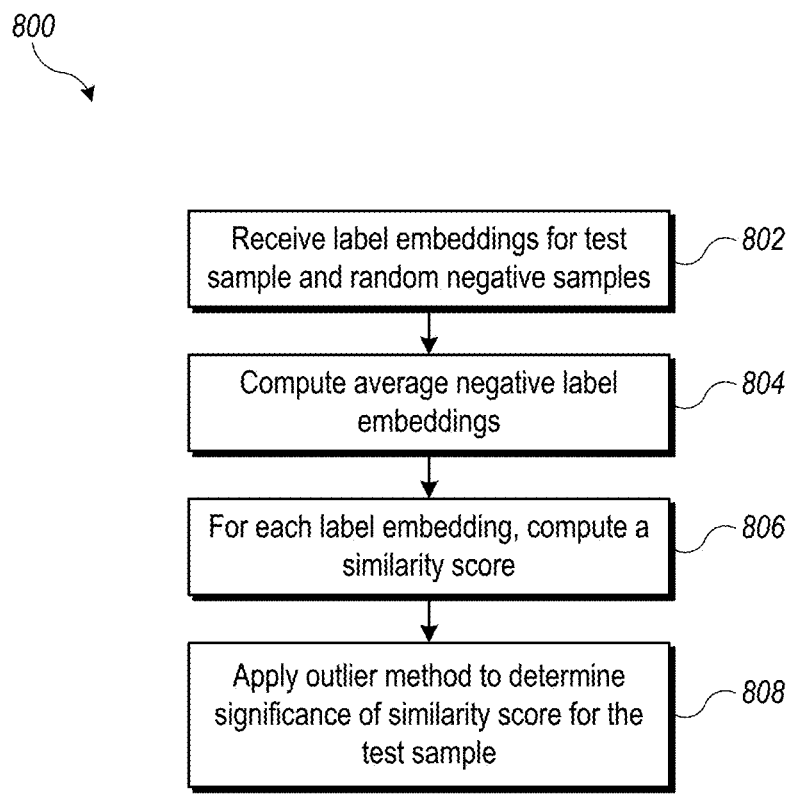
FIG. 8 is a flow diagram of a contrastive analysis process according to some embodiments.

By way of specific example, FIG. 8 is a flow diagram of a contrastive analysis process according to some embodiments. Process 800 can be implemented, e.g., in DCI module 720 of FIG. 7. At block 802, DCI module 720 receives inputs including the output label embeddings 704 for the test sample and the output label embeddings 714 for the random negative samples. At block 804, an average negative label embedding $$\bar{e}''_l = \frac{1}{m} \sum \{\ddot{e}''_{l1}, \ldots, \ddot{e}''_{lm}\}$$

can be calculated. At block 806, for each label embedding, a similarity with the average negative label embedding $\tilde{e}''_l$ is computed according to:

$$\mathcal{D}_l = \exp(e''_l \cdot \tilde{e}''_l) \tag{16}$$

$$\{\mathcal{D}_{l1}, \ldots, \mathcal{D}_{lm}\} = \{\exp(\dot{e}''_{l1} \cdot \tilde{e}''_l), \ldots \exp(\dot{e}''_{lm} \cdot \tilde{e}''_l)\}$$

At block 808, an outlier detection method can be applied to determine the significance of $\mathcal{D}_l$ to $\{\dot{\mathcal{D}}_{l1}, \ldots, \dot{\mathcal{D}}_{lm}\}$, e.g., according to:

$$\hat{y}_l^s \in \{0, 1\} = \text{Outlier}(\mathcal{D}_l, \{\dot{\mathcal{D}}_{l1}, \ldots, \dot{\mathcal{D}}_{lm}\}) \tag{17}$$

where Outlier (a, {b}) is an outlier detection function that compares the first input a to a set of second inputs {b} inputs and returns a value that is 0 if input a is an outlier in a distribution associated with inputs {b}. Various outlier detection functions can be applied, e.g., simple functions based on a threshold number of standard deviations or the like. In some embodiments, the output of DCI module 720 is interpreted as follows: $e''_l$ is a negative label embedding if $\hat{y}_l^s = 0$, otherwise $e''_l$ is a positive label embedding.

Referring again to FIG. 7, a final determination regarding disease l (or label l) can be made using the $\hat{y}_l$ output of LPC 108 and the $\hat{y}_l^s$ output of DCI module 720. Specifically, in the example shown, the final determination that image x is negative for disease l is made only in the event that both $\hat{y}_l$ and $\hat{y}_l^s$ indicate negative results. This logic can be machine-implemented. The DCI approach can provide a more rigorous condition for classifying a testing label embedding as a negative label embedding. The more rigorous condition can reduce false negatives, in which an image showing disease is erroneously classified as negative; this in turn can lead to improved clinical outcomes.

It will be appreciated that the MLC system described above is illustrative and that variations and modifications are possible. The particular structure of various networks or layers can be varied, and different loss functions can be used for training. All processes described herein are also illustrative and can be modified. Operations can be performed in a different order from that described, to the extent that logic permits; operations described above may be omitted or combined; operations described sequentially may be performed in parallel; and operations not expressly described may be added.

EXAMPLE IMPLEMENTATIONS

To illustrate various capabilities of MLC system 100 with dual-pool contrastive training studies have been performed using two different multi-label medical image classification datasets: the "ODIR dataset" and the "NIH-ChestXray 14 dataset."

Figure 9:
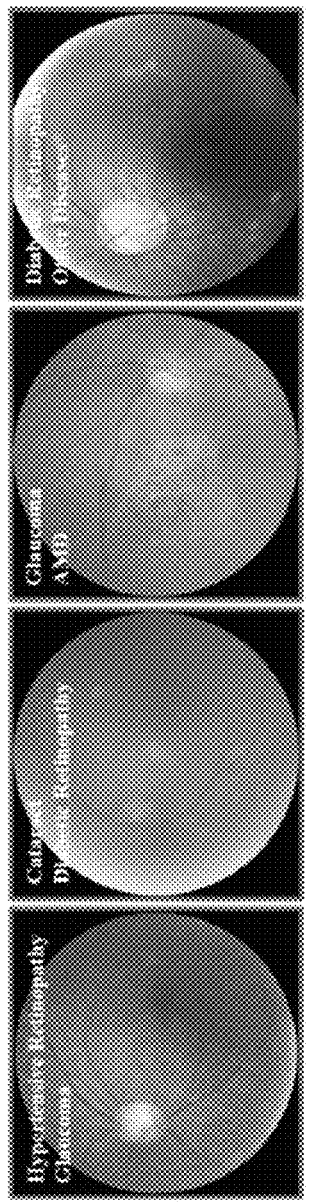
FIG. 9 shows example images from the ODIR dataset, with each image labeled to indicate diseases that are present.

The ODIR dataset is a color fundus image dataset supported by the International Competition on Ocular Disease Intelligent Recognition sponsored by Peking University. A total of 10,000 color fundus images of 5,000 patients are included, captured by various cameras with different image resolutions. Seven eye diseases are labeled in the images: Diabetic Retinopathy (DR); Glaucoma; Cataract; Age-related Macular Degeneration (AMD); Hypertensive Retinopathy (HR); Myopia; and Other Diseases. The label "Other Diseases" is a hybrid that refers to eye diseases other than the first six. FIG. 9 shows example images from the ODIR dataset, with each image labeled to indicate diseases that are present. These seven labels were used in the experiments. For studies described herein, the ODIR data set was randomly divided into a training set (80%), a validation set (10%), and a test set (10%).

Figure 10:
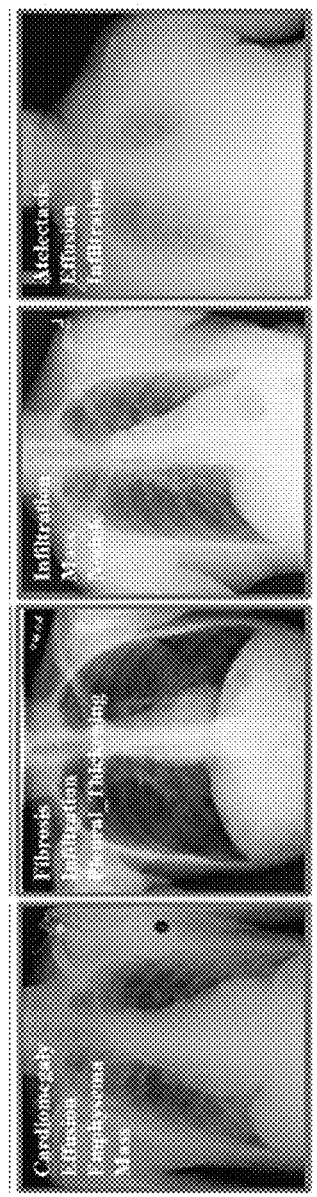
FIG. 10 shows example images from the NIH-ChestXray 14 dataset, with each image labeled to indicate diseases that are present.

The NIH-ChestXray 14 dataset is a chest X-ray image dataset comprising of 112, 120 frontal-view X-ray images from 30,805 patients. Fourteen chest diseases are labeled in the images: Atelectasis; Cardiomegaly; Effusion; Infiltration; Mass; Nodule; Pneumonia; Pneumothorax; Consolidation; Edema; Emphysema; Fibrosis; Pleural Thickening; and Hernia. FIG. 10 shows example images from the NIH-ChestXray 14 dataset, with each image labeled to indicate diseases that are present. The NIH-ChestXray 14 data set is split into a training set (78,468 images), a validation set (11,219 images), and a test set (22,433 images). For studies described herein (except where otherwise indicated), seven low-frequency diseases (Cardiomegaly, Pneumonia, Edema, Emphysema, Fibrosis, Pleural-Thickening, and Hernia) were merged under a hybrid label "Other Diseases"; all other diseases retained their original labels. This results in a set of eight diseases.

An implementation of MLC system 100 was constructed using two NVIDIA TITAN Xp GPUs, and program code implemented with Python and Pytorch. ResNet101 was adopted as the convolutional backbone 202, and the weights were initialized by pre-training on ImageNet dataset. Since the output dimension of ResNet101 is 2048, the size of label embeddings d was set to 2048. All medical images were resized to 640×640 to provide consistent inputs to the network. Triplet attention transformer 106 was implemented with encoder and decoder modules having four encoder/decoder layers. A multi-head module was applied to improve the robustness of transformer, with the number of heads is set to 8. Hyperparameters in the loss function were set as follows: temperature $\tau=1$, and balanced weight $\lambda=0.7$. A threshold of 0.5 was used as the default for label classification. This implementation is referred to herein as "TA-DCL." It should be understood that TA-DCL is used for purposes of illustration and that other implementations are within the scope of the present disclosure.

Training was performed separately for ODIR and NIH-ChestXRay 14 datasets. Image feature extractor 102 was pre-trained using loss function $\mathcal{L}_{ife}$ (Eq. (4)) for 40 epochs, after which the full MLC system 100 was trained using loss function $\mathcal{L}_{total}$ (Eq. (15)) for 100 epochs. The Adam optimizer was used, with initial learning rate of $10^{-4}$ and weight decay of 0.1. The batch size for healthy samples and sick samples in DCT was 16. Random horizontal flipping was adopted for data augmentation during training.

To provide a baseline for comparison, seven existing MLC systems were also implemented and trained on the same datasets. The existing systems used were: (1) "DB-Focal," described in Wu et. al, (2020) Distribution-balanced loss for multi-label classification in long-tailed datasets, in: European Conference on Computer Vision, Springer, pp. 162-178; (2) "C-Tran," described in Lanchantin et al (2021) General multi-label image classification with transformers, in: Proceedings of the IEEE/CVF Conference on Computer Vision and Pattern Recognition, pp. 16478-16488; (3) "Q2L," described in Liu et al. (2021) Query2label: A simple transformer way to multi-label classification, arXiv preprint arXiv:2107.10834; (4) "CheXGCN," described in Chen et al. (2020a) Label co-occurrence learning with graph convolutional networks for multi-label chest x-ray image classification, IEEE journal of biomedical and health informatics 24, 2292-2302; (5) "AnaXNet," described in Agu et al. (2021) Anaxnet: Anatomy aware multi-label finding classification in chest x-ray, in: International Conference on Medical Image Computing and Computer-Assisted Intervention, Springer, pp. 804-813; (6) "MCG-Net," described in Lin et al. (2021) Multi-label classification of fundus images with graph convolutional network and self-supervised learning, IEEE Signal Processing Letters 28, 454-458; and (7) "DRT," described in Song et al. (2021) Deep relation transformer for diagnosing glaucoma with optical coherence tomography and visual field function, IEEE Transactions on Medical Imaging 40, 2392-2402.

To compare the performance of different MLC systems, commonly-used metrics for MLC evaluation were used. Average precision (AP), recall (AR), f1-score (AF1), and kappa (AK) were first calculated separately for each label, after which an unweighted mean was computed. Accuracy (ACC) was calculated according to the rule that classification of a sample is considered accurate only if all labels in the sample are correctly classified as positive or negative. AP and AR were considered as the most likely metrics to provide straightforward performance comparison. Higher AR score indicates a higher rate of correctly classifying positive label embeddings, which corresponds to lower clinical risk. Higher AP score indicates higher total accuracy on all classifications.

FIG. 11 shows a table 1100 summarizing overall performance of TA-DCL and seven existing methods. Metrics AP, AR, AF1, AK, and ACC for each method are shown for both ODIR and NIH-ChestXRay 14 datasets. Best results are shown in bold. In this example, TA-DCL outperforms the existing MLC methods on all metrics for both datasets.

Another desirable capability in clinical applications of MLC is the ability to detect "unseen" diseases that were not present in the training data. To classify positive label embeddings of an unseen disease, existing MLC systems and methods measure the response with classifier weights and rely on low similarity matching. In contrast, MLC networks according to embodiments of the present invention can enlarge the gap between negative label embeddings and positive label embeddings through the use of DCT and can further compare an embedding result for a test sample with a sampling of negative label embeddings through use of DCI, both of which contribute to reducing the error in classification of positive label embeddings. A comparison of the adaptability of TA-DCL and other MLC methods to unseen diseases was performed by removing diseases from the training set using a leave-one-out method. Specifically, each high-frequency disease was selected in turn, and the network was trained using training and validation sets from which samples that included the removed disease were omitted. The trained network was then used to evaluate all samples in the testing set that included the removed disease but not the hybrid "Other Diseases." In a correct result, the testing samples would be classified with the "Other Diseases" label. FIG. 12 is a table 1200 showing the average evaluation results of unseen diseases from the seven tested methods on ODIR and NIH-ChestXray 14 data sets. In this example, performance of TA-DCL consistently exceeds that of other MLC systems, demonstrating better adaptability for unseen diseases.

Those skilled in the art with access to this disclosure will appreciate that empirical tuning and optimization of different network parameters can improve performance and that ablative analyses can be performed to assess the effect of various parameter choices. Examples applied to the TA-DCL implementation will now be described.

Figures 13A, 13B:
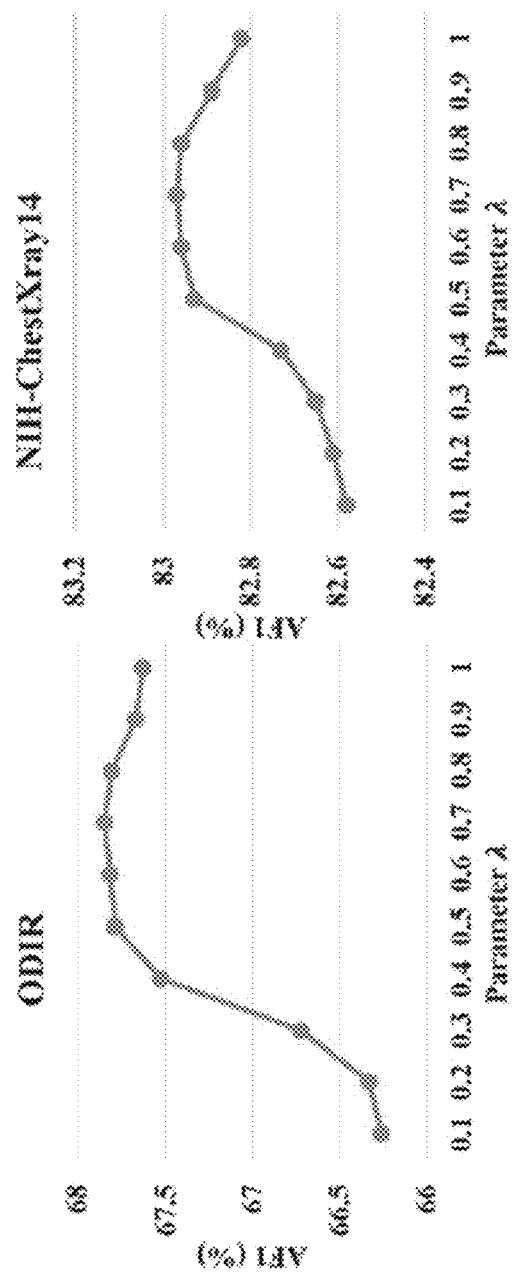
FIGS. 13A and 13B show graphs of disease classification scores for an implementation of a multi-label classifier according to some embodiments with different values of a weighting hyperparameter.

One ablative evaluation pertains to the weight hyperparameter $\lambda$ of Eq. (15), which controls the balance between label prediction loss and dual-pool contrastive loss. By fixing other model parameters, a range of different values of parameter/were evaluated, i.e., $\lambda \in \{0.1, 0.2, \ldots, 1.0\}$. FIGS. 13A and 13B show graphs of the disease classification AF1 scores for the TA-DCL implementation as a function of $\lambda$. As the graphs indicate, $\lambda=0.7$ is optimal for these datasets.

Figure 14A:
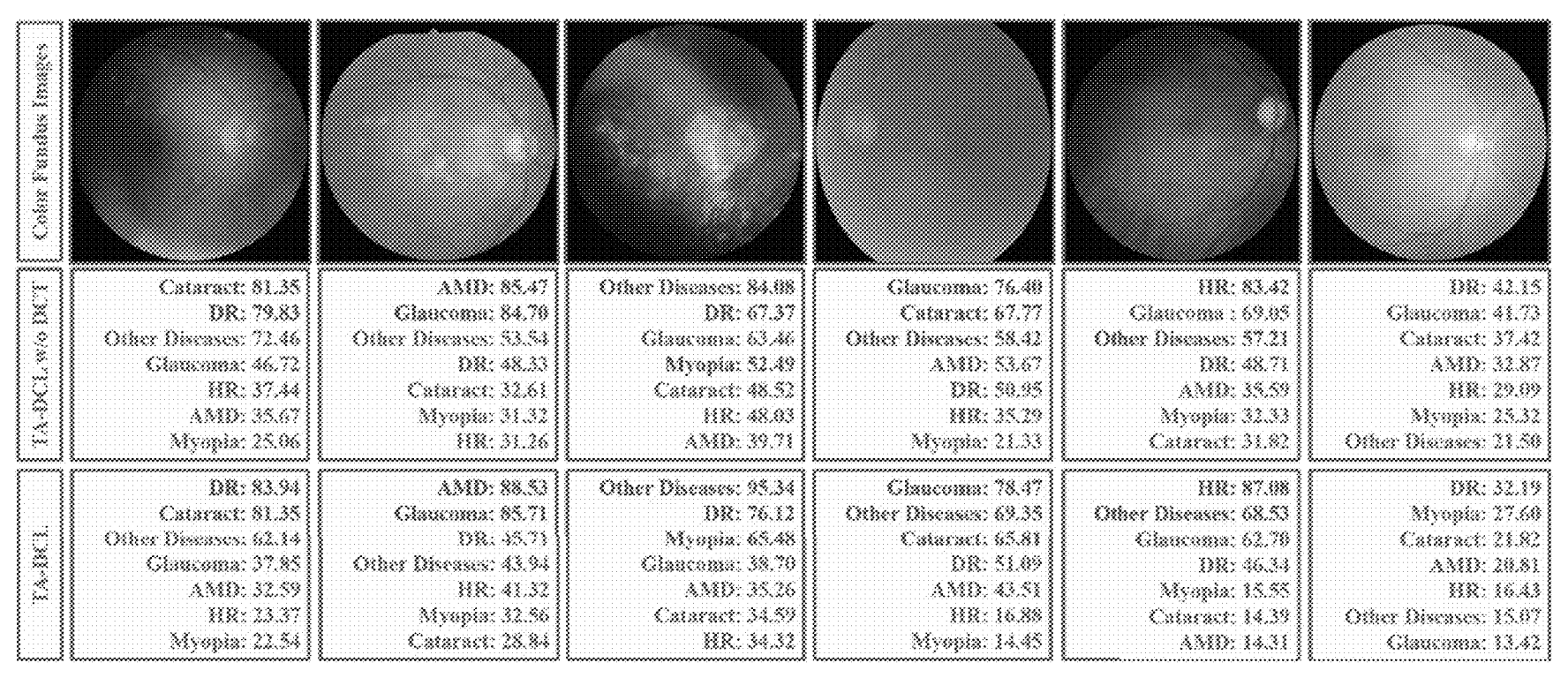
Figure 14B:
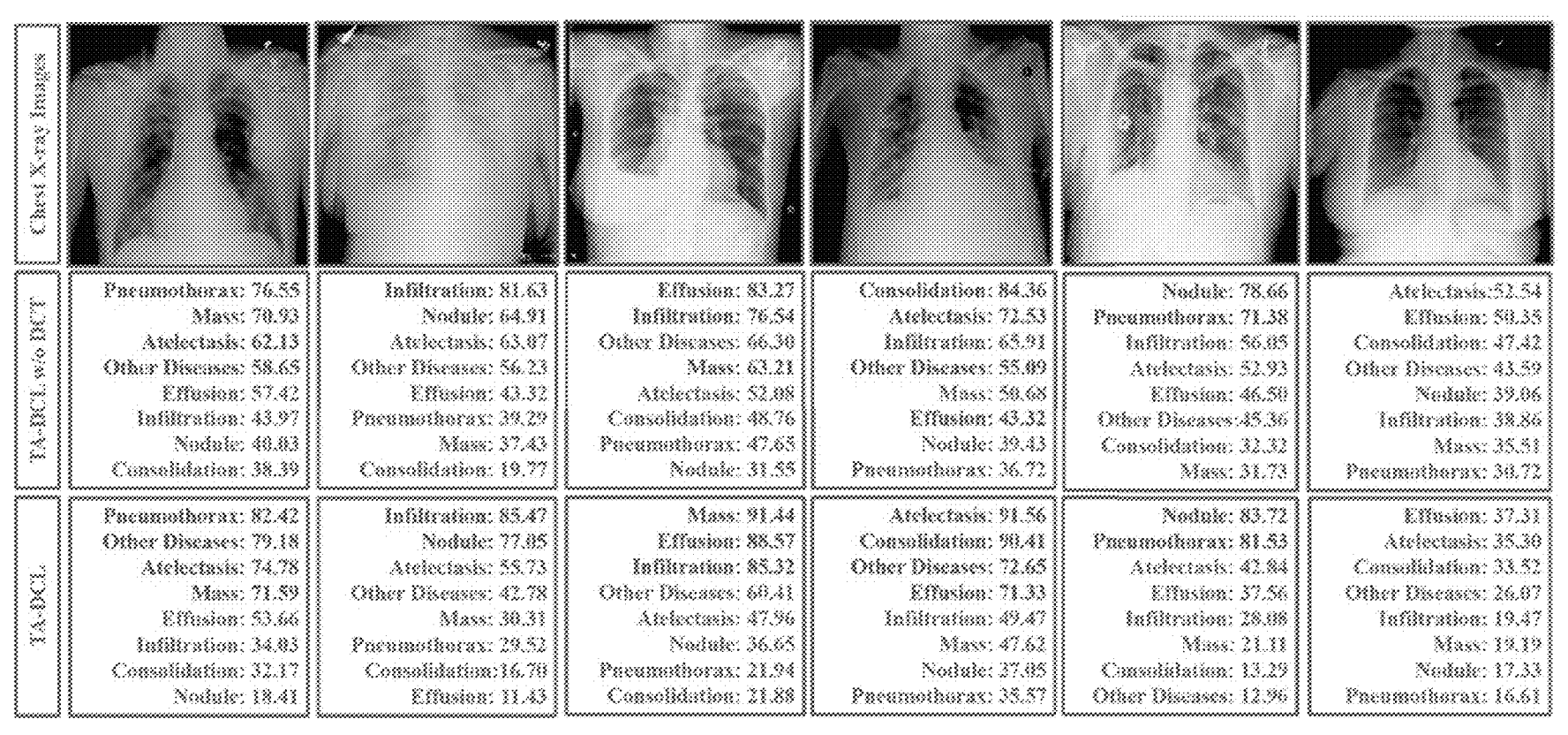

Another ablative evaluation pertains to the effect of DCT. As described above, DCT incorporates inter-pool contrastive loss $\mathcal{L}_{irc}$ and intra-pool contrastive loss $\mathcal{L}_{iac}$, where $\mathcal{L}_{irc}$ learns the differences between positive label embeddings and negative label embeddings of the same disease label, and $\mathcal{L}_{irc}$ learns the differences among positive label embeddings of different disease labels. FIGS. 14A and 14B show example test images and classification outputs illustrating the effect of DCT according to some embodiments. FIG. 14A shows images from the ODIR dataset, and FIG. 14B shows images from the NIH ChestXRay 14 dataset. Below each image are two sets of classification scores, listing a probability score for each label. The upper set of scores was obtained using TA-DCL trained without DCT; the lower set of scores was obtained using TA-DCL with DCT. Ground truth positive (negative) labels for each image are shown in red (black). As FIGS. 14A and 14B suggest, use of DCT can improve the accuracy of labeling.

In addition to DCT in the training stage, some embodiments use DCI in the inference stage, as described above. FIG. 15 shows a table 1500 presenting results of a quantitative analysis comparing metrics for implementations of TA-DCL according to some embodiments. For this analysis, TA-DCL was implemented for both ODIR and NIH-ChestXRay 14 datasets in each of three configurations: without DCT or DCI; with DCT and without DCI; and with both DCT and DCI. In table 1500, presence of DCT or DCI is indicated by a check, absence by an X. As table 1500 indicates, use of DCT without DCI results in improved performance metrics, and further improvement is obtained by also using DCI.

Figure 16:
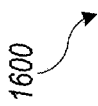
FIG. 16 shows a table of performance metrics obtained for an implementation of a multi-label classifier using different definitions of a hybrid label according to some embodiments.

Another choice of design parameters relates to the merging of low-frequency diseases into a single hybrid label (e.g., "Other Diseases"), where options include how many and which diseases to merge. By way of example, the influence on the number of low-frequency diseases in the hybrid label has been explored using the NIH-ChestXray 14 dataset. Specifically, the fourteen types of diseases were sorted from lowest frequency of occurrence to highest frequency of occurrence. For four different values of $L_{lf}$ ($L_{lf}=\{1, 3, 5, 7\}$), the $L_{lf}$ lowest-frequency diseases were merged into the hybrid label, and TA-DCL was trained accordingly, with all other design parameters remaining the same. FIG. 16 is a table 1600 showing performance metrics obtained using different choices of $L_{lf}$ according to some embodiments. It is noted that overall classification performance of TA-DCL tended to improved when more low-frequency diseases were merged into the hybrid label.

These examples illustrate various features and benefits that can be obtained using MCL networks according to various embodiments. Those skilled in the art with the benefit of this disclosure will appreciate that the performance of a given implementation depends on numerous details and design parameters that are a matter of choice and that, for a given implementation, empirical testing can be used to fine-tune various design parameters.

Additional Embodiments

While the invention has been described with reference to specific embodiments, those skilled in the art with access to this disclosure will appreciate that variations and modifications are possible. For instance, techniques described herein can be applied to different imaging modalities, including photographs (e.g., fundus images), X-rays, computed tomography (CT), magnetic resonance imaging (MRI), and so on. The particular organ(s) or anatomical regions imaged can also be varied. Preferably, a training data set includes a single imaging modality applied to the same organ(s) or anatomical regions, and input images at the inference stage are of like modality and subject. Classification of different imaging modalities and/or different target anatomical features, regions, or structures can be supported by separately training different instances of an MLC network of the kind described herein.

The number and combination of disease labels can be varied as desired, provided that sufficient training data is available for each disease that is separately classified. As described above, it is not necessary to define a complete set of labels covering all diseases or to collect any particular number of samples for each disease. Instead, low-frequency diseases can be merged under a single hybrid label, which allows images indicating such diseases to be flagged for further analysis by a clinician to identify the specific disease.

In some embodiments, the use of a hybrid label can also improve detection of unseen diseases (i.e., diseases not present in the training data set). Conventionally, supervised MLC methods cannot learn to identify unseen diseases in the training stage, since there are (by definition) no training samples to provide effective information. As a result, trained FFN classifiers of conventional design respond poorly to unseen diseases in the inference stage and often fail to detect them. In contrast, embodiments described herein can incorporate DCT to learn differences between negative label embeddings and positive label embeddings across disease labels. Further, in the inference stage, DCI can be used to measure the similarity scores between testing label embeddings and a collection of negative label embeddings, and the similarity scores can be combined with prediction scores of LPC for the final decision. As a result, MLC networks according to some embodiments of the invention can be more rigorous about classifying images as negative (disease-free), thereby reducing false negatives and leading to improved clinical outcomes.

As described above, the output of a multi-label classification system can include a positive or negative determination as to each label, a probability of each label applying, label embeddings, and other information such as any of the intermediate outputs from any or all components of the MLC system. Outputs can be presented to a clinician, e.g., in a computer display or printout. Outputs can also be attached to the image file (e.g., as metadata), stored in a patient record, transmitted to other locations for display or reporting purposes. It is contemplated that clinicians may use the outputs in various ways, e.g., to prioritize images for further analysis (by humans and/or machines), to facilitate diagnosis or monitoring of a disease in a patient, or for a variety of other purposes.

Techniques described herein can be implemented by suitable programming of general-purpose computers. A general-purpose computer can include a programmable processor (e.g., one or more microprocessors including a central processing unit (CPU) and one or more co-processors such as graphics processing units (GPUs) or other co-processors optimized to implement nodes of a deep neural network) and memory to store instructions and data used by the programmable processor. A general-purpose computer can also include user interface components such as a display, speakers, keyboard or keypad, mouse, touch pad, track pad, joystick, touch screen, microphone, printer, etc. A general-purpose computer can also include data communication interfaces to transmit data to other computer systems and/or receive data from other computer systems; examples include USB ports; Ethernet ports; other communication ports to which electrical and/or optical signal wires can be connected; and/or antennas and supporting circuitry to implement wireless communication protocols such as Wi-Fi, Bluetooth, NFC (near-field communication), or the like. In some embodiments, a computer system includes a single computer apparatus, where various subsystems can be components of the computer apparatus. The computer apparatus can have a variety of form factors including, e.g., a laptop or tablet computer, a desktop computer, etc. In other embodiments, a computer system can include multiple computer apparatuses, each being a subsystem, with internal components. A computer system can include a plurality of components or subsystems, e.g., connected together by external interface or by an internal interface. In some embodiments, computer systems, subsystems, or apparatuses can communicate over a network. For instance, a computer system can include a server with massive processing power to implement deep neural networks and a client that communicates with the server, providing instructions for specific network structures and operations.

It should be understood that any of the embodiments of the present invention can be implemented in the form of control logic using hardware (e.g., an application specific integrated circuit or field programmable gate array) and/or using computer software with a programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Rust, Golang, Swift, or scripting language such as Perl, Python, or PyTorch, using, for example, conventional or object-oriented techniques. The software code may be stored as a series of instructions or commands on a computer readable storage medium; suitable media include semiconductor devices such as a random access memory (RAM), a read only memory (ROM), a flash memory device; a magnetic medium such as a hard-drive or a floppy disk; an optical medium such as a compact disk (CD) or DVD (digital versatile disk); and the like. The computer readable storage medium may be any combination of such storage devices or other storage devices capable of retaining stored data. Computer readable storage media encoded with the program code may be packaged with a compatible device or provided separately from other devices. Any such computer readable storage medium may reside on or within a single computer product (e.g. a hard drive, a CD, or an entire computer system), and may be present on or within different computer products within a system or network.

Such programs may also be encoded and transmitted using carrier signals adapted for transmission via wired, optical, and/or wireless networks conforming to a variety of protocols, including the Internet. As such, a computer readable transmission medium (which is distinct from a computer readable storage medium) may be created using a data signal encoded with such programs.

Any of the methods described herein may be totally or partially performed with a computer system including one or more processors, which can be configured to perform the steps. Thus, embodiments can involve computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may be involve specific embodiments relating to each individual aspect, or specific combinations of these individual aspects.

The above description is illustrative and is not restrictive. Many variations of the invention will become apparent to those skilled in the art upon review of the disclosure. The scope of patent protection should, therefore, be determined not with reference to the above description, but instead should be determined with reference to the following claims along with their full scope or equivalents.

What is claimed is:

1. A computer-implemented method comprising:
    defining a set of labels, wherein different labels in the set of labels correspond to different diseases;
    obtaining a training data set, the training data set including a plurality of training images, wherein each training image in the training data set includes a medical image and a ground truth labeling that identifies the medical image as either positive or negative with respect to each label in the set of labels;
    using the training data set to train a multi-label classifier network to assign labels from the set of labels to medical images, wherein the multi-label classifier network includes an image feature extractor, a label embedding extractor, a triplet attention transformer network, and a label prediction classifier, and wherein training the multi-label classifier network includes concurrently:
        training the image feature extractor to extract image spatial features and category attention features from an input image;
        training the label embedding extractor to generate initial label embeddings for the set of labels;
        training the triple attention transformer network to generate updated label embeddings based on the image spatial features, the category attention features, and the initial label embeddings; and
        training the label prediction classifier to predict a probability for each label in the set of labels based on the updated label embeddings, wherein a medical image is classified as positive or negative with respect to each label based on whether the probability exceeds a threshold; and
    performing an inference process, wherein the inference process includes:
        receiving a testing image; and
        applying the trained multi-label classifier network to the testing image to produce an updated label embedding for the testing image and a probability of each label applying to the testing image.

2. The method of claim 1 wherein defining the set of labels includes defining a single hybrid label that corresponds to a plurality of different diseases.

3. The method of claim 2 wherein diseases are assigned to the hybrid label based on a low frequency of occurrence in the training data set.

4. The method of claim 1 wherein the image feature extractor includes:
    a convolutional backbone having a plurality of convolutional weights that outputs a feature matrix;
    a reshaper that operates on a first matrix obtained by applying a shaping weight matrix to the feature matrix to produce the image spatial features; and
    a category-wise attention module that operates on a second matrix obtained by applying an attention weight matrix to the feature matrix,
    wherein training the multi-label classifier network includes training the convolutional weights, the shaping weight matrix, and the attention weight matrix.

5. The method of claim 4 wherein the category-wise attention module includes a first neural network that implements a shortcut function and a second neural network to generate attention scores from the output of the first neural network.

6. The method of claim 1 wherein the triplet attention transformer network includes:
    an encoder module having at least two encoder self-attention layers, wherein the encoder module operates on an input comprising the image spatial features and a combination of the category attention features and the initial label embeddings;
    a splitter module that splits an output of the encoder module into an updated image spatial features matrix and intermediate label embeddings;
    a combiner module that combines the intermediate label embeddings and the category attention features; and
    a decoder module having at least: a decoder self-attention layer that operates on an output of the combiner module; and at least one cross-attention layer that operates on the updated image spatial features matrix and an output of the decoder self-attention layer to produce the updated label embeddings.

7. The method of claim 1 wherein training the multi-label classifier network includes minimizing a loss function, wherein the loss function includes:
    a first term based on comparing a classification output of the multi-label classifier network with the ground truth labeling;
    a second term based on comparing intermediate labels assigned based on the initial label embeddings with the ground truth labeling; and
    a contrastive loss term.

8. The method of claim 7 wherein the contrastive loss term includes:
    an inter-pool contrastive loss term that measures a similarity of label embeddings for a given disease label between a positive sample pool that includes only training images for which the ground truth labeling is positive with respect to at least one of the labels and a negative sample pool that includes only training images for which the ground truth labeling is negative with respect to every one of the labels; and an intra-pool contrastive loss term that measures a similarity of label embeddings for different labels within the positive sample pool.

9. The method of claim 1 wherein performing the inference process further comprises:

applying a threshold to the probability of each label, wherein the testing image is identified as positive with respect to a given label if the probability of the given label exceeds the threshold and negative with respect to the given label otherwise.

10. The method of claim 1 wherein performing the inference process further comprises:

producing an initial classifier output by applying a threshold to the probability of each label, wherein the initial classifier output identifies the testing image as positive with respect to a given label if the probability of the given label exceeds the threshold and negative with respect to the given label otherwise;

randomly selecting a negative sample pool that includes only training images for which the ground truth labeling is negative with respect to every one of the labels;

using the trained multi-label classifier network to generate a reference updated label embedding for each training image in the negative sample pool;

computing an average label embedding from the reference label embeddings;

computing a first similarity score for an updated label embedding generated by the trained multi-label classifier network for the testing image and the average label embedding;

computing a reference set of similarity scores that includes a similarity score for each of the reference label embeddings and the average label embedding; and performing an outlier detection process on the first similarity score and the reference set of similarity scores to determine, for each label, whether a significant difference exists; and generating a contrastive labeling for the testing image, wherein the contrastive labeling is positive with respect to each label where a significant difference exists and negative with respect to that label otherwise.

11. The method of claim 10 wherein performing the inference process further comprises:

using the classification from the multi-label classifier network and the contrastive labeling to determine a final labeling for the testing image, wherein the final labeling is negative with respect to a given label if both the classification from the multi-label classifier network and the contrastive labeling are negative and the final labeling is positive otherwise.

12. A system comprising:
a memory; and
a processor coupled to the memory and configured to:
define a set of labels, wherein different labels in the set of labels correspond to different diseases;
obtain a training data set, the training data set including a plurality of training images, wherein each training image in the training data set includes a medical image and a ground truth labeling that identifies the medical image as either positive or negative with respect to each label in the set of labels;

use the training data set to train a multi-label classifier network to assign labels from the set of labels to medical images, wherein the multi-label classifier network includes an image feature extractor, a label embedding extractor, a triplet attention transformer network, and a label prediction classifier, and wherein training the multi-label classifier network includes concurrently:

training the image feature extractor to extract image spatial features and category attention features from an input image;

training the label embedding extractor to generate initial label embeddings for the set of labels;

training the triple attention transformer network to generate updated label embeddings based on the image spatial features, the category attention features, and the initial label embeddings; and training the label prediction classifier to predict a probability for each label in the set of labels based on the updated label embeddings, wherein a medical image is classified as positive or negative with respect to each label based on whether the probability exceeds a threshold; and perform an inference process, wherein the inference process includes:
receiving a testing image; and
applying the trained multi-label classifier network to the testing image to produce an updated label embedding for the testing image and a probability of each label applying to the testing image.

13. The system of claim 12 wherein the image feature extractor includes:

a convolutional backbone having a plurality of convolutional weights that outputs a feature matrix;

a reshaper that operates on a first matrix obtained by applying a shaping weight matrix to the feature matrix to produce the image spatial features; and a category-wise attention module that operates on a second matrix obtained by applying an attention weight matrix to the feature matrix, wherein training the multi-label classifier network includes training the convolutional weights, the shaping weight matrix, and the attention weight matrix.

14. The system of claim 13 wherein the category-wise attention module includes a first neural network that implements a shortcut function and a second neural network to generate attention scores from the output of the first neural network.

15. The system of claim 12 wherein the triplet attention transformer network includes:

an encoder module having at least two encoder self-attention layers, wherein the encoder module operates on an input comprising the image spatial features and a combination of the category attention features and the initial label embeddings;

a splitter module that splits an output of the encoder module into an updated image spatial features matrix and intermediate label embeddings;

a combiner module that combines the intermediate label embeddings and the category attention features; and a decoder module having at least: a decoder self-attention layer that operates on an output of the combiner module; and at least one cross-attention layer that operates on the updated image spatial features matrix and an output of the decoder self-attention layer to produce the updated label embeddings.

16. A non-transitory computer-readable storage medium having stored therein program code instructions that, when executed by a processor in a computer system, cause the processor to perform a method comprising:
defining a set of labels, wherein different labels in the set of labels correspond to different diseases;
obtaining a training data set, the training data set including a plurality of training images, wherein each training image in the training data set includes a medical image and a ground truth labeling that identifies the medical image as either positive or negative with respect to each label in the set of labels;
using the training data set to train a multi-label classifier network to assign labels from the set of labels to medical images, wherein the multi-label classifier network includes an image feature extractor, a label embedding extractor, a triplet attention transformer network, and a label prediction classifier, and wherein training the multi-label classifier network includes concurrently:
training the image feature extractor to extract image spatial features and category attention features from an input image;
training the label embedding extractor to generate initial label embeddings for the set of labels;
training the triple attention transformer network to generate updated label embeddings based on the image spatial features, the category attention features, and the initial label embeddings; and
training the label prediction classifier to predict a probability for each label in the set of labels based on the updated label embeddings, wherein a medical image is classified as positive or negative with respect to each label based on whether the probability exceeds a threshold; and
performing an inference process, wherein the inference process includes:
receiving a testing image; and
applying the trained multi-label classifier network to the testing image to produce an updated label embedding for the testing image and a probability of each label applying to the testing image.

17. The non-transitory computer-readable storage medium of claim 16 wherein defining the set of labels includes defining a single hybrid label that corresponds to a plurality of different diseases and wherein diseases are assigned to the hybrid label based on a low frequency of occurrence in the training data set.

18. The non-transitory computer-readable storage medium of claim 16 wherein training the multi-label classifier network includes minimizing a loss function, wherein the loss function includes:
a first term based on comparing a classification output of the multi-label classifier network with the ground truth labeling;
a second term based on comparing intermediate labels assigned based on the initial label embeddings with the ground truth labeling; and
a contrastive loss term that includes:
an inter-pool contrastive loss term that measures a similarity of label embeddings for a given disease label between a positive sample pool that includes only training images for which the ground truth labeling is positive with respect to at least one of the labels and a negative sample pool that includes only training images for which the ground truth labeling is negative with respect to every one of the labels; and
an intra-pool contrastive loss term that measures a similarity of label embeddings for different labels within the positive sample pool.

19. The non-transitory computer-readable storage medium of claim 16 wherein performing the inference process further comprises:
producing an initial classifier output by applying a threshold to the probability of each label, wherein the initial classifier output identifies the testing image as positive with respect to a given label if the probability of the given label exceeds the threshold and negative with respect to the given label otherwise;
randomly selecting a negative sample pool that includes only training images for which the ground truth labeling is negative with respect to every one of the labels;
using the trained multi-label classifier network to generate a reference updated label embedding for each training image in the negative sample pool;
computing an average label embedding from the reference label embeddings;
computing a first similarity score for an updated label embedding generated by the trained multi-label classifier network for the testing image and the average label embedding;
computing a reference set of similarity scores that includes a similarity score for each of the reference label embeddings and the average label embedding; and
performing an outlier detection process on the first similarity score and the reference set of similarity scores to determine, for each label, whether a significant difference exists; and
generating a contrastive labeling for the testing image, wherein the contrastive labeling is positive with respect to each label where a significant difference exists and negative with respect to that label otherwise.

20. The non-transitory computer-readable storage medium of claim 19 wherein performing the inference process further comprises:
using the classification from the multi-label classifier network and the contrastive labeling to determine a final labeling for the testing image,
wherein the final labeling is negative with respect to a given label if both the classification from the multi-label classifier network and the contrastive labeling are negative and the final labeling is positive otherwise.

* * * * *